Feb. 22, 1938.   F. E. SCHWENTLER   2,109,037
AUTOMATIC SLACK ADJUSTER
Filed Nov. 17, 1936
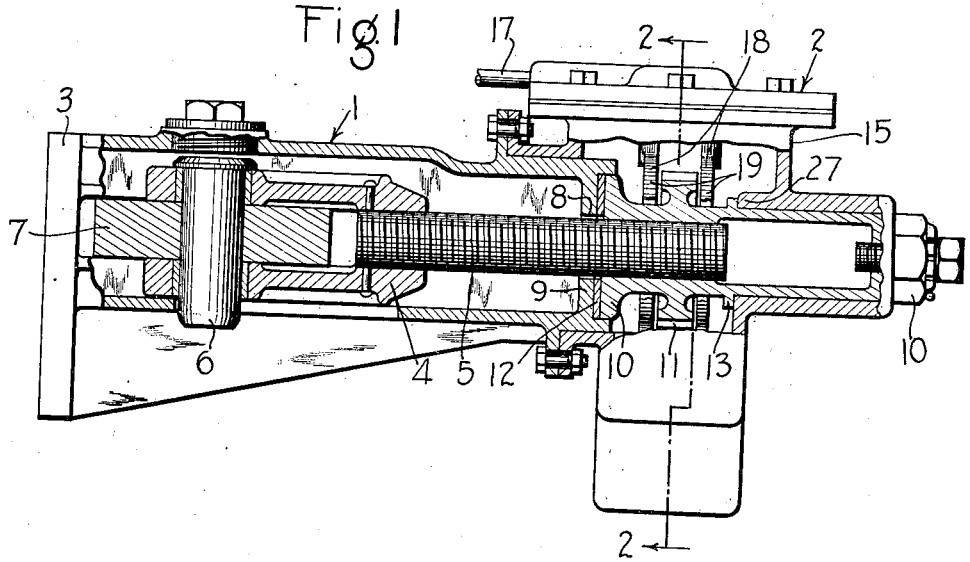
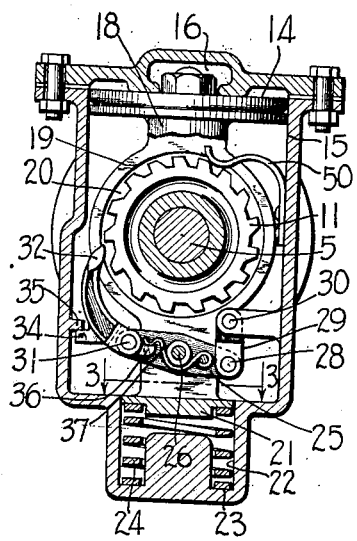
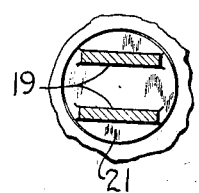
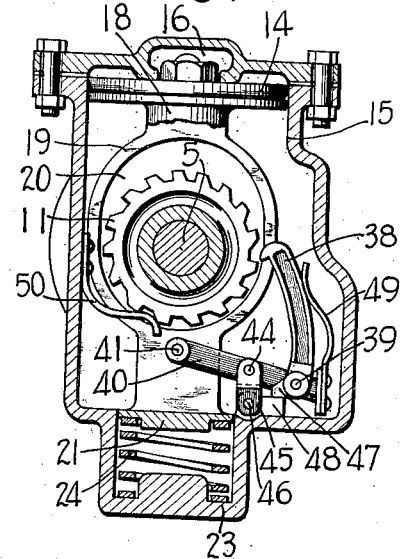
INVENTOR
FRANCIS E. SCHWENTLER
BY Wm. M. Cady
ATTORNEY Patented Feb. 22, 1938

2,109,037

UNITED STATES PATENT OFFICE 2,109,037

AUTOMATIC SLACK ADJUSTER

Francis E. Schwentler, St. Louis, Mo., assignor to The American Brake Company, Wilmerding, Pa., a corporation of Missouri Application November 17, 1936, Serial No. 111,221

12 Claims. (Cl. 188—203)

This invention relates to slack adjusters adapted to automatically take up slack in railway brake riggings caused by wear of the brake shoes and other parts, and more particularly to a slack adjuster of the type which is supplied with fluid under pressure from the brake cylinder when the brake cylinder piston has moved out a predetermined distance in applying the brakes and which, when fluid under pressure is released therefrom in releasing the brakes, will operate to take up slack.

Slack adjusters of the above mentioned type are each provided with a slack take-up mechanism and a fluid pressure controlled motor or cylinder mechanism for effecting the operation of the slack take-up mechanism. The cylinder mechanism is usually disposed at right angles to the slack take-up mechanism and at one side thereof, and due to this and to the fact that the cylinder mechanism is of considerable length, the overall dimensions of the slack adjuster have heretofore been such as to render it difficult to mount the adjuster where the available space is limited, this being especially the case where the brake cylinder and slack adjuster is to be mounted on a vehicle truck instead of on the body.

The available space on the truck for mounting the brake cylinder and slack adjuster is necessarily very limited and it has been found exceptionally difficult to properly mount the slack adjuster, and at the same time adhere to the usual very restricted limitations about the truck.

The principal object of the invention is to provide an improved slack adjuster of the above mentioned type in which the overall dimensions are reduced to a minimum without impairing the efficiency of the adjuster.

According to this object the cylinder mechanism of the adjuster is disposed in such a manner that the longitudinal axis thereof intersects the longitudinal axis of the take-up mechanism, so that the width of the adjuster in the plane of the cylinder is greatly reduced over that of an adjuster in which the longitudinal axis of the usual cylinder mechanism is spaced from the longitudinal axis of the take-up mechanism. Further, the piston rod of the cylinder mechanism is made in the form of a yoke which passes around the ratchet wheel of the adjusting nut and due to this compact arrangement the length of the cylinder mechanism may be reduced to a minimum.

Another object of the invention is to provide a slack adjuster of the above type with a lever mechanism through the medium of which the piston of the cylinder mechanism is adapted to effect the operation of the take-up mechanism, and another feature resides in connecting such lever mechanism to the piston rod of the cylinder mechanism at the longitudinal axis of the piston and in adjustably mounting the mechanism to permit movement thereof in directions laterally of the piston rod when the rod is actuated, so as to prevent the lever mechanism from transmitting undue force laterally to the piston rod, thus insuring the free operation of the piston.

Another object of the invention is to provide an improved slack adjuster of the above type having lever means for actuating the adjusting pawl which means is so arranged that the length of the stroke of the piston to produce a chosen adjustment will be less than that heretofore required to produce the same degree of adjustment, and due to this the length of the cylinder mechanism will be reduced considerably and will of course lessen the over-all depth of the adjuster.

Other objects and advantages will appear in the following more detailed description of the invention.

In the accompanying drawing, Fig. 1 is a side elevational view, mainly in vertical section, of an automatic slack adjuster embodying the invention; Fig. 2 is a cross sectional view of the adjuster taken on the line 2—2 of Fig. 1; Fig. 3 is a cross-sectional view taken on the line 3—3 of Fig. 2; and Fig. 4 is a view similar to Fig. 2 but illustrating a modified form of the adjuster.

The slack adjuster comprises a casing having a hollow horizontally disposed section 1 and a cylinder mechanism section 2, the sections being secured together in any desired manner.

The outer end of the section 1 is provided with a laterally extending face plate 3 which is adapted to be secured to a car truck frame (not shown) or to the pressure head of the usual brake cylinder (not shown) of a railway fluid pressure brake equipment.

Slidably mounted in the section 1 to move longitudinally thereof is a cross-head 4 which is secured to one end of a non-rotatable longitudinally movable slack take-up screw 5 and which is pivotally connected, through the medium of a pin 6, to a member to be adjusted which member, as shown in the present embodiment of the invention, may be a dead lever 7 or any other suitable brake lever of a brake rigging.

The other end of the slack take-up screw 5 extends through an opening 8 in an end wall 9 of the casing section 1 into the plane of the casing section 2 and is operatively engaged by a threaded rotatable adjusting nut 10 journalled at one end in the casing section 2 and at its other end in the casing section 1, said nut, adjacent its inner end being provided with a ratchet wheel 11 through the medium of which the nut is adapted to be rotated. The outer end of the nut projects beyond the casing section 2 for engagement by a wrench or other suitable tool for manual operation to reset the adjuster when resetting is necessary.

The inner end of the nut 10 bears against a bearing plate 12 which is carried by the wall 9 of the casing section 1 and prevents longitudinal movement of the nut in a direction toward the left and an annular collar 13 provided on the nut to the right of the ratchet wheel bears against an annular boss 27 carried by the casing section 2 and prevents longitudinal movement of the nut in a direction toward the right.

The cylinder mechanism for controlling the automatic operation of the slack take-up nut 10 and screw 5, comprises a piston 14 which is slidably mounted in a cylinder portion 15 of the casing section 2 for reciprocatory movement. At the face side of the piston is a chamber 16 which is connected to a pipe 17 leading from the interior of the brake cylinder (not shown) as is usual. With the brake cylinder piston in brake release position the brake cylinder end of the pipe 17 is open to the non-pressure side of the brake cylinder piston and with the brakes applied and the brake cylinder piston moved beyond a predetermined position due to wear of the usual brake shoes or the several other parts of the brake rigging the pipe will be open to the pressure side of the brake cylinder piston. This method of connecting the pipe 17 to one side or the other of the brake cylinder piston is accomplished in the usual manner and for this reason it has been deemed unnecessary to illustrate the brake cylinder and brake cylinder piston.

The piston 14 of the cylinder mechanism is so arranged at one side of the ratchet wheel 11 that its longitudinal axis extends centrally through the toothed face of the wheel and intersects the longitudinal axis of the take-up screw 5 and adjusting nut 10 at right angles. The piston 14 is provided with a piston rod 18 which extends past the ratchet wheel in the form of spaced parallel extensions 19 which are disposed one at each end of the ratchet wheel and which are provided with openings 20 of such dimensions as to permit the ratchet wheel and inner end of the adjusting nut to be passed therethrough in assembling the adjuster and to also permit the operation of the piston without interference by the ratchet wheel. The lower ends of the extensions are connected together by means of a circular spring seat 21 which is slidably guided by the inner surface of the annular side wall 22 of a recess provided in the casing section 2. Contained in this recess and interposed between and engaging the bottom wall 23 of the recess and the spring seat 21 is a spring 24 which at all times tends to urge the piston toward its normal position in which position the piston is shown in Fig. 2.

Adjacent the spring seat 21 and extending between and parallel with the piston rod extensions 19 is a lever 25 which is pivotally connected intermediate its ends to the extensions by means of pin 26, the axes of the piston 14 and pin 26 intersecting each other at right angles. One end of the lever 25 is pivotally fulcrumed by means of a pin 28 to a hanger link 29 which is pivotally connected by means of pin 30 to the casing section 2. The other end of the lever has pivotally connected thereto, by means of a pin 31, a pawl 32 which is adapted to be moved into and out of operative engagement with the teeth of the ratchet wheel 11. The pawl is provided with an operating lug 34 which extends outwardly and which is adapted to be engaged by a lug 35, carried by the casing section 2, for moving the pawl out of engagement with the ratchet wheel as will hereinafter more fully appear.

Integral with and extending outwardly from the inner end of the pawl 32 is a lug 36 which is engaged by a leaf spring 37 carried by the lever 25 and which at all times tends to urge the pawl into engagement with the ratchet wheel 11.

In operation when, in effecting an application of the brakes, the brake cylinder piston moves such a distance that it establishes communication from the pressure side thereof to the pipe 17, fluid under pressure flows from the brake cylinder through pipe 17 to the piston chamber 16 and causes the piston, piston rod, pivot pin 26 and spring seat 21 to move to their innermost position, the spring seat as it thus moves, compressing the spring 24.

As the piston rod and pivot pin 26 mounted therein are being moved inwardly the lever 25 is caused to rock in a counterclockwise direction about the fulcrum pin 28 which is carried by the hanger link 29. Upon such movement the lug 34 of the pawl is moved out of engagement with the lug 35 on the casing section 2 and the leaf spring 37 carried by the lever and acting on the lug 36 of the pawl causes the pawl to rock in a clockwise direction about the pivot pin 31 into engagement with the toothed periphery of the ratchet wheel 11. As the lever 25 is thus being moved the pawl will ratchet over one tooth of the ratchet wheel and when the piston 14 completes its inward stroke the pawl will engage the tooth which is in advance of the tooth from which the arm has been previously disengaged.

In releasing the brakes when the brake cylinder piston in its movement to release position cuts off the communication between the pressure side thereof and the pipe 17 and establishes communication between the non-pressure or atmospheric side and the pipe 17, fluid under pressure is vented from the piston chamber 16. With the chamber thus vented, the spring 24 acting through the medium of the spring seat 21 causes the piston rod and piston to move to their normal position. As the piston rod is thus being moved it causes the lever 25 pivotally connected therewith to rock in a clockwise direction about the fulcrum pin 28, causing the pawl 32 to be moved in a direction toward the ratchet wheel 11. Upon such movement the pawl, being in engagement with a tooth of the ratchet wheel, causes the ratchet wheel and thereby the nut 10 to be rotated in a clockwise direction. Due to the threaded connection between the slack take-up screw 5 and the adjusting nut 10, this movement of the nut causes the screw to move longitudinally in a direction toward the right hand and adjust the lever 7 to compensate for slack. As the piston nears the end of its stroke, the lug 34 of the pawl is engaged by the lug 35 on the casing 2 and due to such engagement will cause the pawl to be rocked out of operative engagement with the ratchet wheel 11 at substantially the same time as the piston completes its stroke. It will be noted that when the pawl is disengaged from the ratchet wheel, the nut will have been rotated the distance of one tooth of the ratchet wheel.

With the pawl out of engagement with the ratchet wheel a leaf spring 50 carried by the casing section and at all times in contact with the toothed periphery of the ratchet wheel, prevents accidental rotation of the adjusting nut, however the frictional resistance offered by the spring is such that it may be easily overcome when the nut is rotated manually through the medium of a wrench or other suitable tool applied to the end portion of the nut projecting through the casing section 2.

In Fig. 4 a modification of the slack adjuster is illustrated in which the construction and arrangement of the several parts, with the exception of the pawl for actuating the ratchet wheel and the lever for operating the pawl, are substantially the same as those of the adjuster shown in Figs. 1, 2 and 3 and are indicated by the same reference numerals.

In this form of the adjuster the pawl 38 instead of being adapted to push the ratchet wheel in adjusting to take up slack as is the pawl shown in Fig. 2, is adapted to pull the ratchet wheel. One end of the pawl 38 is adapted to operatively engage the toothed periphery of the ratchet wheel and the opposite end is pivotally connected through the medium of a pin 39 to one end of a lever 40 which extends between the spaced extensions 19 of the piston rod and which at its inner end is pivotally connected to said extensions by means of a pin 41 carried by the extensions, the axis of the pin intersecting the axis of the piston and piston rod at right angles adjacent the spring seat 21.

The lever 40, intermediate its ends, is rockably fulcrumed on a pin 44 carried by one end of a support link 45, the opposite end of the link being pivotally connected by a pin 46 to the casing section 2.

The pawl 38 is provided with an outwardly extending lug 47 which is adapted to be engaged by a lug 48 on the casing to move the pawl out of operative engagement with the ratchet wheel when the piston and associated parts are in their normal position as shown in Fig. 4.

Secured to the lever 40 is a leaf spring 49 which at all times tends to urge the pawl 38 in a direction toward the ratchet wheel.

In operation when the piston is moved inwardly by fluid under pressure from the brake cylinder the lever 40 is rocked about the fulcrum pin 44 in a counterclockwise direction causing the pawl 38 to move in a direction toward the piston. As the pawl is thus being moved the lugs 47 and 48 disengage so that the spring 49 is permitted to move the pawl into engagement with the back of an adjacent tooth of the ratchet wheel. As the movement of the lever continues the pawl ratchets over the tooth and engages the face thereof, the movement of the pawl by the spring into operative relation with the tooth occurring just prior to the piston completing its inward stroke.

When, in releasing the brakes, the spring 24 acts to move the piston toward its outer or normal position, the lever 40 is caused to rock about the fulcrum pin 44 in a clockwise direction so that the pawl 38 rotates the ratchet wheel and thereby the adjusting nut in a clockwise direction. Just prior to the piston completing its stroke, the lugs 47 and 48 on the pawl and casing respectively cooperate to move the pawl out of engagement with the ratchet wheel, thus freeing the nut for adjustment manually.

As shown the fulcrum pin 44 is located nearer the pivotal connection between the lever 40 and the pawl 38 than to the connection between the lever and piston rod extensions 19 and due to this, for a given adjustment, the stroke of the piston will be longer than that of the piston shown in Fig. 2, however, the stroke may be made shorter by relocating the fulcrum pin 44 nearer the pin 41.

It will be noted that as the lever of either of the adjusters hereinbefore described is moved by the piston rod the link connection between the lever and the casing will act to prevent any binding action between the lever and its fulcrum.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In an automatic slack adjuster, in combination, a longitudinally movable slack take-up element, a rotatable adjusting nut for actuating said slack take-up element, and a fluid pressure controlled motor for actuating said adjusting nut, said motor being arranged so that the longitudinal axis thereof intersects the longitudinal axis of the adjusting nut at right angles, said motor extending from one side of the nut to the other and said nut extending through operating portions of said motor.

2. In an automatic slack adjuster, in combination, a longitudinally movable slack take-up element, a rotatable adjusting nut for actuating said slack take-up element, a fluid pressure controlled motor for actuating said adjusting nut, said motor comprising a piston adapted to be controlled by fluid under pressure, a piston rod carried by said piston and having a portion surrounding a portion of said adjusting nut, a pawl for actuating said nut, a lever for actuating said pawl operatively connected to said piston rod, and a fulcrum for said lever pivotally supported to swing in the direction of the length of the lever.

3. In an automatic slack adjuster, in combination, a longitudinally movable slack take-up element, a rotatable adjusting nut for actuating said slack take-up element, a fluid pressure controlled motor for actuating said adjusting nut, said motor comprising a piston adapted to be controlled by fluid under pressure, a piston rod carried by said piston and having a portion surrounding a portion of said adjusting nut, a pawl for actuating said nut, a lever for actuating said pawl operatively connected to said piston rod, the longitudinal axis of the connection between said lever and piston rod intersecting the longitudinal axis of said piston, and a fulcrum for said lever pivotally supported for movement in the direction of the length of said lever.

4. In an automatic slack adjuster, in combination, a longitudinally movable slack take-up element, a rotatable adjusting nut for actuating said slack take-up element, and a fluid pressure controlled motor for actuating said adjusting nut, said motor comprising a piston arranged at one side of said nut and adapted to be controlled by fluid under pressure, a piston rod carried by said piston and extending beyond the other side of said nut, a pawl for actuating said nut, and a lever located at said other side of said nut adapted to be actuated by said piston rod for actuating said pawl.

5. In an automatic slack adjuster, in combination, a longitudinally movable slack take-up element, a rotatable adjusting nut for actuating said slack take-up element, a fluid pressure controlled motor for actuating said adjusting nut, said motor comprising a fluid pressure controlled piston disposed at one side of said nut and movable along a line at right angles to the longitudinal axis of said nut, a piston rod carried by said piston and passing around said nut to the other side thereof, a pawl for actuating said nut, and a lever for actuating said pawl operatively connected to said piston rod at said other side of the nut and on the longitudinal center line of the piston rod.

6. In an automatic slack adjuster, in combination, a longitudinally movable slack take-up element, a rotatable adjusting nut for actuating said slack take-up element, a fluid pressure controlled motor for actuating said adjusting nut, said motor comprising a fluid pressure controlled piston disposed at one side of said nut and movable along a line at right angles to the longitudinal axis of said nut, a piston rod carried by said piston and passing around said nut to the other side thereof, a pawl for actuating said nut, and a lever for actuating said pawl operatively connected to said piston rod at said other side of the nut, the center of the connection between said lever and piston rod being on the longitudinal axis of said piston.

7. In an automatic slack adjuster, in combination, a casing, a longitudinally movable slack take-up element mounted in said casing, an adjusting nut operatively engaging said slack take-up element and rotatably mounted in said casing in axial alignment with the slack take-up element, a toothed wheel on said nut through which said nut is adapted to be rotated, a pawl for actuating said toothed wheel, a lever for actuating said pawl, and a fluid pressure controlled motor for actuating said lever, said fluid pressure controlled motor comprising a piston disposed at one side of said ratchet wheel and having its longitudinal axis intersecting the longitudinal axis of said nut at right angles, a piston rod carried by said piston comprising spaced extensions arranged one at each end of the ratchet wheel and looping around said nut, and a pin extending between and carried by said extensions beyond said nut operatively connecting said lever to said extensions, the axes of said pin and piston intersecting each other at right angles.

8. In an automatic slack adjuster, in combination, a casing, a longitudinally movable slack take-up element mounted in said casing, an adjusting nut operatively engaging said slack take-up element and rotatably mounted in said casing in axial alignment with the slack take-up element, a toothed wheel on said nut through which said nut is adapted to be rotated, a pawl for actuating said toothed wheel, a lever for actuating said pawl, a floating fulcrum for said lever, and a fluid pressure controlled motor for actuating said lever, said fluid pressure controlled motor comprising a piston disposed at one side of said ratchet wheel and having its longitudinal axis intersecting the longitudinal axis of said nut at right angles, a piston rod carried by said piston comprising spaced extensions arranged one at each end of the ratchet wheel and looping around said nut, and a pin extending between and carried by said extensions beyond said nut operatively connecting said lever to said extensions, the axes of said pin and piston intersecting each other at right angles.

9. In an automatic slack adjuster, in combination, a casing, a longitudinally movable slack take-up element mounted in said casing, an adjusting nut operatively engaging said slack take-up element and rotatably mounted in said casing in axial alignment with the slack take-up element, a toothed wheel on said nut through which said nut is adapted to be rotated, a pawl for actuating said toothed wheel, a lever for actuating said pawl, a fulcrum for said lever pivotally carried by said casing for movement in the direction of the length of the lever, a fluid pressure controlled motor for actuating said lever, said fluid pressure controlled motor comprising a piston disposed at one side of said ratchet wheel and having its longitudinal axis intersecting the longitudinal axis of said nut at right angles, a piston rod carried by said piston comprising spaced extensions arranged one at each end of the ratchet wheel and looping around said nut, and a pin extending between and carried by said extensions beyond said nut operatively connecting said lever to said extensions, the axes of said pin and piston intersecting each other at right angles.

10. In an automatic slack adjuster, in combination, a casing, a longitudinally movable slack take-up element mounted in said casing, an adjusting nut operatively engaging said slack take-up element and rotatably mounted in said casing in axial alignment with the slack take-up element, a toothed wheel on said nut through which said nut is adapted to be rotated, a pawl for actuating said toothed wheel, a lever for actuating said pawl, a lost motion fulcrum connection pivotally fulcruming said lever to said casing, a fluid pressure controlled motor for actuating said lever, said fluid pressure controlled motor comprising a piston disposed at one side of said ratchet wheel and having its longitudinal axis intersecting the longitudinal axis of said nut at right angles, a piston rod carried by said piston comprising spaced extensions arranged one at each end of the ratchet wheel and looping around said nut, and a pin extending between and carried by said extensions beyond said nut operatively connecting said lever to said extensions, the axes of said pin and piston intersecting each other at right angles.

11. In an automatic slack adjuster, in combination, a longitudinally movable slack take-up element, a rotatable adjusting nut for actuating said slack take-up element, a fluid pressure controlled motor for actuating said adjusting nut, said motor comprising a pawl operative to actuate said nut, a lever disposed at one side of said nut for actuating said pawl, a piston rod for actuating said lever and a piston for actuating said piston rod, said piston being so arranged at the other side of said nut that the longitudinal axis of the piston intersects the axis of the nut at right angles, and being operative by fluid under pressure for actuating said lever to cause said pawl to operatively engage said nut, and being operative upon the release of fluid under pressure for actuating said lever to cause said pawl to rotate said nut, and means cooperating with said pawl to move said pawl out of engagement with said nut as the piston is completing its stroke upon the release of fluid under pressure.

12. In an automatic slack adjuster, in combination, a longitudinally movable slack take-up element, a rotatable adjusting nut for actuating said slack take-up element, a fluid pressure controlled motor for actuating said adjusting nut, said motor comprising a piston which is so arranged at one side of said nut that the longitudinal axis of the piston intersects the longitudinal axis of the nut at right angles, a piston rod carried by said piston and extending around said nut to the other side thereof, a pawl for actuating said nut, and a lever operatively connected to said piston rod at said other side of the nut for actuating said pawl, said piston being operative by fluid under pressure for actuating said lever to cause said pawl to operatively engage said nut and being operative upon the release of fluid under pressure for actuating said lever and thereby said pawl to rotate said nut to take up slack.

FRANCIS E. SCHWENTLER.